US010372491B2

(12) United States Patent
Zimmer et al.

(10) Patent No.: US 10,372,491 B2
(45) Date of Patent: Aug. 6, 2019

(54) EXECUTION CONTEXT MIGRATION METHOD AND APPARATUS

(71) Applicant: Intel Corporation, Santa Clara, CA (US)

(72) Inventors: Vincent J. Zimmer, Federal Way, WA (US); Jiewen Yao, Shanghai (CN); Sarathy Jayakumar, Portland, OR (US); Robert C. Swanson, Olympia, WA (US); Rajesh Poornachandran, Portland, OR (US); Gopinatth Selvaraje, Portland, OR (US); Mingqiu Sun, Beaverton, OR (US); John S. Howard, Portland, OR (US); Eugene Gorbatov, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 78 days.

(21) Appl. No.: 15/553,481

(22) PCT Filed: Mar. 23, 2015

(86) PCT No.: PCT/CN2015/074838
§ 371 (c)(1),
(2) Date: Aug. 24, 2017

(87) PCT Pub. No.: WO2016/149895
PCT Pub. Date: Sep. 29, 2016

(65) Prior Publication Data
US 2018/0046502 A1 Feb. 15, 2018

(51) Int. Cl.
G06F 9/48 (2006.01)
G06F 9/46 (2006.01)
(Continued)

(52) U.S. Cl.
CPC .......... *G06F 9/4856* (2013.01); *G06F 1/1632* (2013.01); *G06F 1/3215* (2013.01);
(Continued)

(58) Field of Classification Search
CPC ..................................................... G06F 9/4856
See application file for complete search history.

(56) References Cited

U.S. PATENT DOCUMENTS 6,549,968 B1 4/2003 Hart
6,651,163 B1 11/2003 Kranich et al.
(Continued)

FOREIGN PATENT DOCUMENTS

CN 1967713 A 5/2007
CN 101452406 A 6/2009
(Continued)

OTHER PUBLICATIONS

International Search Report and Written Opinion dated Dec. 3, 2016 for International Application No. PCT/CN2015/074838, 12 pages.
Extended European Search Report dated Mar. 5, 2019 for European Patent Application No. 15885834.0, 22 pages.

*Primary Examiner* — Charlie Sun
(74) *Attorney, Agent, or Firm* — Schwabe, Williamson & Wyatt, P.C.

(57) ABSTRACT

Methods, apparatuses and storage medium associated with migration between processors by a computing device are disclosed. In various embodiments, a portable electronic device having an internal processor and internal memory may be attached to a dock. The dock may include another processor as well other memory. The attachment of the dock to the portable electronic device may cause an interrupt. In response to this interrupt, a state associated with the internal processor may be copied to the other memory of the dock.

(Continued)

Instructions for the computing device may then be executed using the other processor of the dock. Other embodiments may be disclosed or claimed.

20 Claims, 7 Drawing Sheets

(51) Int. Cl.
G06F 1/3287 (2019.01)
G06F 9/50 (2006.01)
G06F 1/16 (2006.01)
G06F 1/3215 (2019.01)
G06F 1/3293 (2019.01)

(52) U.S. Cl.
CPC .......... *G06F 1/3287* (2013.01); *G06F 1/3293* (2013.01); *G06F 9/46* (2013.01); *G06F 9/4812* (2013.01); *G06F 9/4893* (2013.01); *G06F 9/5027* (2013.01); *Y02D 10/122* (2018.01); *Y02D 10/171* (2018.01); *Y02D 10/24* (2018.01)

(56) References Cited

U.S. PATENT DOCUMENTS

| | | |
|---|---|---|
| 2008/0209199 A1 | 8/2008 | Sadovsky et al. |
| 2009/0013171 A1 | 1/2009 | Gilling |
| 2009/0198989 A1 | 8/2009 | Rofougaran et al. |
| 2011/0106979 A1 | 5/2011 | Yoo et al. |
| 2011/0239006 A1 | 9/2011 | Hsu et al. |
| 2012/0331464 A1* | 12/2012 | Saito ............... G06F 9/5077 718/1 |
| 2013/0042236 A1* | 2/2013 | Kagan ............ G06F 9/45558 718/1 |
| 2013/0212586 A1 | 8/2013 | Doyle et al. |
| 2015/0095598 A1* | 4/2015 | Abou Gazala ....... G06F 9/46 711/162 |
| 2016/0041931 A1* | 2/2016 | Gupta ............. G06F 9/4856 710/8 |

FOREIGN PATENT DOCUMENTS

| | | |
|---|---|---|
| CN | 101542433 A | 9/2009 |
| CN | 102334102 A | 1/2012 |

\* cited by examiner

EXECUTION CONTEXT MIGRATION METHOD AND APPARATUS

CROSS REFERENCE TO RELATED APPLICATIONS

The present application is a national phase entry under 35 U.S.C. § 371 of International Application No. PCT/CN2015/074838, filed Mar. 23, 2015, entitled "EXECUTION CONTEXT MIGRATION METHOD AND APPARATUS", which designated, among the various States, the United States of America. The Specification of the PCT/CN2015/074838 Application is hereby fully incorporated by reference.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A computing device may be characterized by its components. Typically, a computing device may include a processor, memory, and storage. For example, various smartphones and tablet computers may be characterized by the use of mobile double data rate (DDR) synchronous random access memory (RAM), also called low power DDR or LPDDR, as well as ultra-low-voltage microprocessors. These smartphones may include an operating system (OS), iOS from Apple® Computer or Android from Google®, in support of the various applications developed for the respective smartphones.

As central processing unit (CPU) architectures, OSs, and the like evolve, a computing device may have difficulty reconciling the computing capabilities of, for example, an OS with limitations of an ultra-low-voltage microprocessor. While an ultra-low-voltage microprocessor may be cost- and power-efficient, there may be some sacrifice in terms of computing performance. Therefore, computing devices may benefit from additional resources, such as processor power, in some instances in which such additional resources are made available.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

Figure 1:
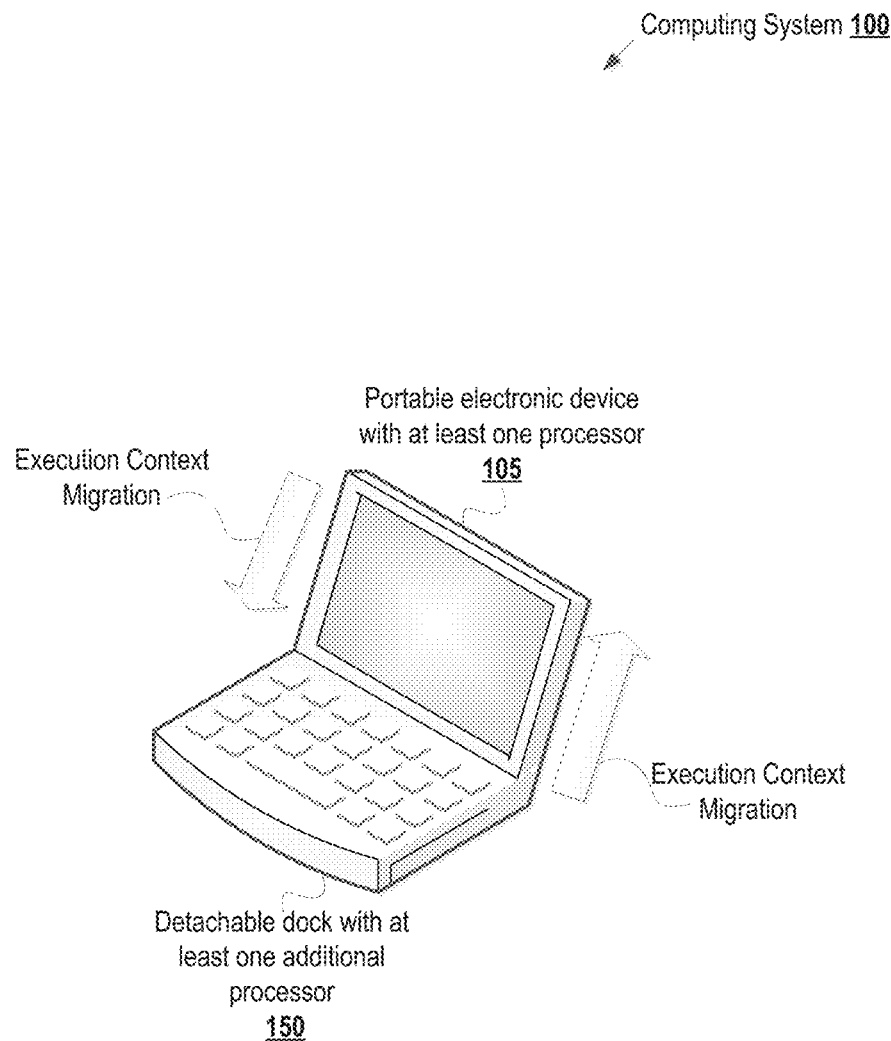
FIG. 1 is a block diagram illustrating an example computing system that includes the execution context migration teaching of the present disclosure, in accordance with various embodiments.

FIG. 1 illustrates an example computing system 100 that includes execution context migration teaching of the present disclosure, in accordance with various embodiments. Computing system 100, as shown, includes a portable electronic device 105 incorporated with at least one processor and a dock 150 incorporated with at least one additional processor (also referred to as a "base"). The portable electronic device 105 may be a laptop computer, a tablet computer, a smartphone, a personal digital assistant, a game console, an Internet appliance, or other portable electronic devices of the like. Examples of a portable electronic device 105, except for the execution context migration teaching of the present disclosure, may include, but are not limited to, laptop computers available from Dell Computer of Austin, Tex., smartphones and computing tablets available from Apple Computer of Cupertino, Calif., game consoles available from Nintendo Corporation of Tokyo, Japan, and so forth.

The dock 150 may be any external hardware component configured to be coupled with the portable electronic device 105 and may also be referred to as a "base" or "docking station." In various embodiments, the dock 150 may include one or more components suitable to supplement the portable electronic device 105. For example, the detachable dock 150 may be configured to provide user input to the portable electronic device 105, such as through a keyboard, trackpad, microphone, and the like. Examples of a detachable dock 150, except for the execution context migration teaching of the present disclosure, may include, but are not limited to, docking stations for tablet computers available from Microsoft Corporation of Redmond, Wash., Samsung of Samsung Town, Seoul, South Korea, and so forth.

The computing system 100 may be configured so that the portable electronic device 105 is removable from the dock 150, for example, to facilitate portability of the portable electronic device 105. In embodiments, the portable electronic device 105 may be powered on and may be capable of executing instructions when the dock 150 is coupled with and/or uncoupled from the portable electronic device 105; that is, the portable electronic device 105 and the dock 150 may be configured for a "hot swap," which may include a "hot remove" or a "hot plug." A hot swap of the portable electronic device 105 and the dock 150 may be accomplished with minimal interruption to operations of the portable electronic device 105.

The portable electronic device 105 may include at least one processor configured to execute instructions of the portable electronic device 105, such as instructions from an operating system (OS). The at least one processor of the portable electronic device 105 may be adapted for mobile application and/or fiscal considerations, such as a relatively low-power processor, such as a microprocessor. Thus, the at least one processor of the portable electronic device 105 may offer acceptable power consumption and/or overall cost of the portable electronic device 105, although perhaps at the expense of some speed and/or efficiency offered through other processors.

The dock 150 may include at least one additional processor. In embodiments, the at least one additional processor of the dock 150 may offer increased computing power relative to the at least one processor of the portable electronic device 105. Such a higher-power processor may be suitable for implementation in the dock 150, for example, due to additional space in the housing of the dock 150, another battery and/or wired power connection, and the like.

The portable electronic device 105 may be configured to utilize the additional processor of the dock 150, when docked, for example, to improve performance of the portable electronic device 105. For example, reliability, availability, and serviceability (RAS) may be leveraged for execution context migration based on the CPU hot plug, memory hot plug, CPU migration, and/or memory migration.

In embodiments, the portable electronic device 105 may be coupled with the dock 150 (e.g., by a hot swap) and, in response, some operations of the portable electronic device 105 may be transferred to the additional processor of the dock 150. When the portable electronic device 105 is uncoupled from the dock 150 (e.g., by a hot remove), the portable electronic device 105 may resume operation in a customary manner (e.g., the at least one processor of the portable electronic device 105 would resume execution of instructions from an OS of the portable electronic device 105). In this way, the portable electronic device 105 may benefit from additional computing resources in instances in which coupling with the dock 150 is desirable and/or feasible, while still preserving portability and/or power when uncoupled from the dock 150.

Figure 2:
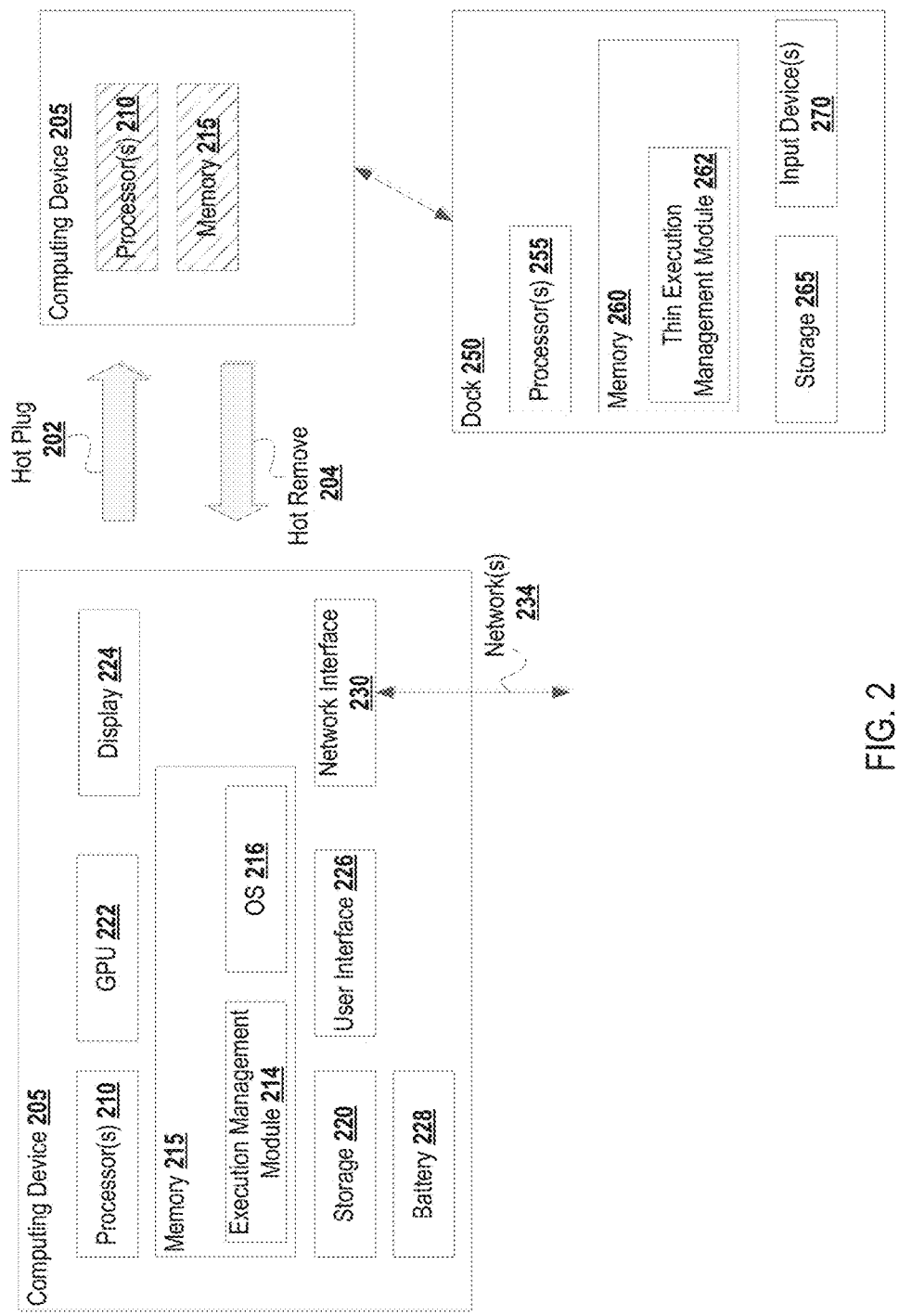
FIG. 2 is a block diagram illustrating a computing device that is to have execution context migrated between a dock and the computing device, in accordance with various embodiments.

Turning now to FIG. 2, a block diagram illustrates a computing device 205 that is to have execution context migrated between a dock 250, in accordance with various embodiments. The computing device 205 may be an embodiment of the portable electronic device 105 and the dock 250 may be an embodiment of the dock 150, as illustrated in FIG. 1.

As shown, for the illustrated embodiments, the computing device 205 may include one or more processors 210, memory 215, storage 220, a graphics processing unit (GPU) 222, a display 224, a user interface 226, a network interface 230, and a battery 228, coupled with each other at least as shown. The processor 210 may be configured to execute instructions of an execution management module 214 and an OS 216, loaded from memory 215. The OS 216 may be adapted for mobile devices, e.g., iOS from Apple Computer of Cupertino, Calif., or Android from Google of Mountain View, Calif.

The processor 210 is intended to represent a broad range of processors, such as single or multi-core processors of various execution speeds and power consumptions. In various embodiments, the processor 210 of the computing device 205 may be adapted for inclusion in portable electronic devices, such as an ultra-low-voltage processor or microprocessor. An example of the processor 210 may be the Atom CPU from Intel Corporation of Santa Clara, Calif.

Similarly, the memory 215 is intended to represent memory of various architectures with one or more levels of caches, and of various types, such as dynamic random access, flash, and so forth. In various embodiments, the memory 215 may comprise memory adapted for inclusion in portable electronic devices. For example, the memory 215 may include double data rate synchronous dynamic random access memory for mobile computers, which may also be known as "Mobile DDR," "mDDR," "Low Power DDR," or "LPDDR." In some embodiments, the processor 210 and the memory 215 (as well as additional components, such as the GPU 222) may be integrated, such as in a system on chip (SoC).

In various embodiments, the GPU 222 may be configured to provide video decoding and/or graphics processing functions (e.g., for the OS 216), while the display 224 may be configured to enable content to be rendered thereon. Similarly, the GPU 222 and the display 224 are intended to represent a broad range of graphics processors and display elements known in the art. Likewise, the storage 220 is intended to represent any storage medium suitable for inclusion in a portable electronic device. Examples of the storage 220 include flash (e.g., NAND flash), electrically erasable programmable read-only memory (EEPROM), and so forth. The storage 220 may include removable storage, such as secure digital (SD) cards, including microSD.

The network interface 230 may be comprised of transmit circuitry and/or receive circuitry. The network interface 230 may be configured to transmit and/or receive data over any number of different wired and/or wireless networks. Accordingly, the one or more network(s) 234 is (are) intended to represent a broad range of networks known in the art. Examples of network(s) 234 may include wired or wireless, local or wide area, private or public networks, including the Internet.

The user interface 226 may allow a user to interact with the computing device 205 through various means, according to different embodiments—e.g., the user interface 226 may be presented to a user on the display 224 as a graphical user interface or through a command line interface. To receive user input, the user interface 226 may be implemented in hardware, software, or a combination of the two and may include or may be communicatively coupled with one or more hardware devices suitable for user input (e.g., a keyboard, mouse, touch screen, or gesture recognition).

To power one of more of the illustrated components, the computing device 205 may include a battery 228. The battery 228 is intended to represent any battery suitable to power a portable electronic device. Examples of the battery 228 include lithium-ion batteries, nickel-metal hydride batteries, and so forth.

The processor 210 may be configured to execute instructions of an OS 216, loaded from memory 215. The OS 216 may be adapted for mobile devices, e.g., iOS from Apple Computer of Cupertino, Calif., or Android from Google of Mountain View, Calif. In various embodiments, the OS 216 may be configured to initiate the execution of the instructions, such as instructions provided by an application (not shown). The OS 216 may be adapted to perform other operations across the components of the computing device 205, including threading, resource management, data storage control, and other similar functionalities.

The processor 210 may be further configured to execute instructions of an execution management module 214, loaded from memory 215. The execution management module 214 may be implemented in firmware of the computing device 205. In various embodiments, the execution management module 214 may be configured to process and/or handle interrupts—e.g., the execution management module 214 may be configured to cause execution of code based on an interrupt and return to normal execution (e.g., return control to the OS 216).

In various embodiments, the execution management module 214 may be associated with System Management Mode (SMM). Accordingly, the execution management module 214 may comprise code to be executed in response to a System Management Interrupt (SMI).

Similar to the computing device 205, the dock 250 may include a plurality of components. The dock 250 may include one or more processors 255, memory 260, storage 265, and one or more input devices 270, coupled at least as shown, in one embodiment, the dock 250 may include a power source and/or may be configured to be connected to a power source e.g., the dock 250 may include a power cord adapted to plug into a conventional alternating current (AC) socket.

The processor 255 of the dock 250 is intended to represent a broad range of processors, such as single or multi-core processors of various execution speeds and power consumptions. In various embodiments, the processor 255 of the dock 250 may be suitable for inclusion in a computer system that is of a greater computing power than processors suitable for portable electronic devices. For example, the processor 255 of the dock 250 may have greater performance and/or memory bandwidth than the processor 210 of the computing device 205. An example of the processor 255 may be the Intel Core microprocessor from Intel Corporation of Santa Clara, Calif. (e.g., Intel Core i7, Intel Core i5, Intel Core i3, and the like).

Similarly, the memory 260 is intended to represent memory of various architectures with one or more levels of caches, and of various types, such as dynamic random access, flash, and so forth. In various embodiments, the memory 260 of the dock 250 may be suitable for inclusion in a computer system that is of a greater computing power than processors suitable for portable electronic devices. For example, the memory 260 may include double data rate fourth generation synchronous dynamic random-access memory, which may also be known as "DDR4 SDRAM" or simply "DDR4." In some embodiments, the processor 255 and the memory 260 (as well as additional components) may be integrated, such as in an SoC.

The storage 265 is intended to represent any storage medium of various capacities suitable for inclusion in a dock. Examples of the storage 265 include flash (e.g., NAND flash), electrically erasable programmable read-only memory (EEPROM), hard disk drive (HDD), and so forth. Likewise, the input device(s) 270 are intended to represent any suitable device configured to receive input from a user. Examples of input device(s) 270 include a keyboard, a mouse, a trackpad, a microphone, and so forth.

When the computing device 205 is not coupled with the dock 250, the computing device 205 may operate in a conventional manner—e.g., the processor 210 of the computing device 205 may execute instructions of the OS 216, which may be loaded from memory 215, data may be accessed from and/or written to storage 220, and other similar operations.

The computing device 205 may be coupled with the dock 250, such as through a hot plug 202. This hot plug 202 may effect migration of at least a part of execution context from the computing device 205 to the dock 250. For example, the processor 255 and memory 260 of the dock 250 may load and execute instructions from the OS 216, which may offer greater performance and/or memory bandwidth beyond that available from the processor 210 and/or memory 215 of the computing device 205.

In embodiments, the hot plug 202 may cause an interrupt to be generated, e.g., a SMI. This interrupt may be generated by hardware and/or firmware of the computing device 205, such as through the basic input/output (BIOS).

In response to the interrupt, the execution management module 214 may cause the processor 255 of the dock 250 to be initialized. Thereafter, the execution management module 214 may copy at least a part of a state associated with the processor 210 of the computing device 205 from memory 215 to the memory 260 of the dock 250.

In various embodiments, the interrupt may cause the computing device 205 to enter SMM so that the execution management module 214 may be executed. In SMM, some operations of the computing device 205 may be suspended, such as operations associated with the OS 216. The state of the processor 210 may be stored in RAM of the memory 215 and, in SMM, the execution management module 214 may copy the state of the processor 210 to a section of RAM in the memory 260 of the dock 250.

Additionally, the execution management module 214 may cause other data stored in the memory 215 of the computing device 205 to be copied to the memory 260 of the dock 250. This other data may include, for example, instructions that are to be executed by a processor, such as instructions from the OS 216 and/or other data in cache memory. Further, the execution management module 214 may switch one or more memory banks associated with the memory 215 of the computing device 205 to one or more memory banks associated with the memory 260 of the dock 250. In connection with this switching of memory banks, the execution management module 214 may switch address mapping from the memory banks associated with the memory 215 of the computing device 205 to one or more memory banks associated with the memory 260 of the dock 250.

Accordingly, the computing device 205 may have available thereto the processor 255 and memory 260 of the dock 250 when coupled with the dock 250. In embodiments, the execution management module 214 may update data associated with the OS 216 to reflect this availability. For example, one or more Advanced Configuration and Power Interface (ACPI) tables may be edited to indicate a higher P state (i.e., processor performance state) than before coupling of the computing device 205 with the dock 250. That is, the execution management module 214 may cause the OS 216 to be informed of a P state commensurate with the processor 255 of the dock 250 rather than a P state commensurate with the processor 210 of the computing device 205. Consequently, the OS 216 may observe faster access to memory 260, which the OS 216 may infer as an effect of the higher P state.

In some embodiments, the dock 250 may include a thin execution management module 262, which may rely on the execution management module 214 to complete various operations. The computing device 205 may copy this thin execution management module 262 to the memory 260 of the dock during execution context migration. The thin execution management module 262 may cooperate with the execution management module 214 of the computing device 205, for example, to copy instructions and/or processor state to the memory 260 of the dock 250 and cause execution of instructions using the processor 255 of the dock 250.

In embodiments, this migration of the processor state and memory from the computing device 205 to the dock 250 by the execution management module 214 may be transparent to the OS 216. For example, the OS 216 and/or other applications may continue operation while this migration occurs, albeit with suspension of normal execution during the migration.

In various embodiments, the execution management module 214 may cause the storage 265 of the dock 250 to be visible to the OS 216 as removable storage. The presentation of the storage 265 as removable may prevent data corruption and/or loss due to uncoupling of the computing device 205 from the dock 250. In another embodiment, the storage 265 of the dock 250 may be used as a cache for storage. The input device(s) 270 of the dock 250 may be utilized by the computing device 205 in any known manner. In various embodiments, the input device(s) 270 may be used to receive input from a user in place of, or in tandem with, the user interface 226.

To resume normal operation using the processor 255 and memory 260 of the dock 250, the execution management module 214 may cause another interrupt to be generated. An example of this interrupt may be a System Control interrupt (SCI). This other interrupt may be an interrupt visible to the OS 216 and may cause the OS 216 to reevaluate capabilities of the hardware, such as processor performance and/or memory bandwidth. In various embodiments, the OS 216 may issue a CPUID opcode to determine processor type and memory capabilities. In response to the CPU request, the execution management module 214 may indicate, to the OS 216, that resources of the processor 255 and memory 260 of the dock 250 are available to the computing device 205. However, this indication may include an identification of the processor 210 of the computing device 205, so that the OS 216 observes operation as if executing on the processor 210 of the computing device 205 but with resources available from the processor 255 and memory 260 of the dock 250.

Because execution of the computing device 205 may utilize the processor 255 and the memory 260 of the dock 250, the processor 210 and/or the memory 215 of the computing device 205 may be transitioned to a low-power state. For example, the execution management module 214 may place the processor 210 of the computing device 205 in a deeper C state (i.e., processor operating state), such as C1 through C9. Additionally, the execution management module 214 may decrease power to one or more memory banks of the memory 215. However, at least one core of the processor 210 may be associated with management of this migration process and may remain active. For example, at least one core of the processor 210 may be dedicated to execution of the execution management module 214 and, therefore, may remain active.

In various embodiments, migration from the computing device 205 to the dock 250 may be contingent upon validation of the dock 250 by the computing device 205. For example, the execution management module 214 may issue a challenge to the dock 250 and receive a response. The execution management module 214 may determine if the dock 250 is verified for the execution of instructions (e.g., instructions of the OS 216) based on the response. In various embodiments, the challenge may include cryptographic verification of an instruction architecture firmware image of the dock 250, verification of a fixed token on the dock 250 (e.g., trusted platform module, wireless cloud element, etc.), or another challenge-response validation technique.

In various embodiments, at least one core of the processor 210 of the computing device 205 may be associated with execution of secure or trusted operations. Such secure operations may be unsuitable for migration between processors—e.g., a secure process may be inexorably tied to a processor on which it was started. For example, a set of secure instructions associated with the processor 210 may be used by the OS 216 (or another application) to reserve private regions of code and/or data to protect sensitive data, prevent unauthorized access to code, and so forth. Examples of secure operations include Software Guard Extensions (SGX) defined by Intel Corporation of Santa Clara, Calif., daemon processes (e.g., init processes), and so forth. Processes comprising secure operations may be executed by the processor 210 of the computing device 205 and not migrated to the processor 255 of the dock 250.

In the event that a process on the processor 255 of the dock 250 is to execute one or more secure operations, the one or more secure operations may be trapped by the execution management module 214 and sent to the processor 210 of the computing device 205 for execution. In embodiments, an interrupt (e.g., an SMI) may be generated when the processor 255 of the dock 250 attempts to execute a secure operation and, in response to the interrupt, the execution management module 214 may cause the secure operation to be sent to the processor 210 of the computing device 205. After execution of the secure operation on the processor 210 of the computing device 205, normal execution may resume with the processor 255 of the dock.

The computing device 205 may be booted while coupled with the dock 250. In such an embodiment, execution of operations may be performed by the processor 255 and memory 260 of the dock 250, as described. However, in embodiments, the computing device 205 may boot into its own processor 210, for example, so that secure operations, daemon processes, and the like continue execution on at least one core of the processor 210 of the computing device 205. Thus, in the event of uncoupling, these secure operations, daemon processes, etc., are not separated from the computing device 205 and the computing device 205 may continue operation.

Similar to the hot plug 202, the computing device 205 may be uncoupled from the dock 250, such as through a hot remove 204. This hot remove 204 may effect migration of at least a part of execution context from the dock 250 to the computing device 205. For example, the processor 210 of the computing device 205 may resume execution of instructions from the OS 216 loaded from the memory 215.

In embodiments, the hot remove 204 may cause an interrupt to be generated, e.g., an SMI. This interrupt may be generated by hardware and/or firmware of the computing device 205, such as through the basic input/output (BIOS).

In response to the interrupt, the execution management module 214 may cause the processor 210 of the computing device 205 to be initialized. As described, at least one core of the processor 210 may be active even where context has been migrated to the dock 250 and, therefore, initialization of the processor 210 may include initialization of another core that may have been inactive and/or in a low-power state. Thereafter, the execution management module 214 may copy at least a part of a state associated with the processor 255 of the dock 250 from the memory 260 to the memory 215 of the computing device 205. Similar to the hot plug 202, the interrupt generated based on the hot remove 204 may cause the computing device 205 to enter an SMM. In SMM, some operations of the computing device 205 may be suspended, such as operations associated with the OS 216. The state of the processor 255 may be stored in RAM of the memory 260 and, in SMM, the execution management module 214 may copy the state to a section of RAM in the memory 215 of the computing device 205.

Additionally, the execution management module 214 may copy other data stored in the memory 260 of the dock 250 to the memory 215 of the computing device 205. This other data may include, for example, instructions that are to be executed by a processor, such as instructions from the OS 216 and/or other data in cache memory. Further, the execution management module 214 may switch one or more memory banks associated with the memory 260 of the dock 250 to one or more memory banks associated with the memory 215 of the computing device 205. In connection with this switching of memory banks, the execution management module 214 may switch address mapping from the memory banks associated with the memory 260 of the dock 250 to one or more memory banks associated with the memory 215 of the computing device 205.

Consequently, the computing device 205 may have available thereto only its own processor 210 and memory 215 when uncoupled from the dock 250 through a hot remove 204. In embodiments, the execution management module 214 may update data associated with the OS 216 to reflect this availability. For example, one or more ACPI tables may be edited to indicate a lower P state than before uncoupling of the computing device 205 from the dock 250. That is, the execution management module 214 may inform the OS 216 of a P state commensurate with the processor 210 of the computing device 205 rather than a P state commensurate with the processor 255 of the dock 250.

In embodiments, this migration of the processor state and memory from the dock 250 to the computing device 205 by the execution management module 214 may be transparent to the OS 216. For example, the OS 216 and/or other applications may continue operation while this migration occurs, albeit with suspension of normal execution during the migration. Also in connection with the hot remove 204, the OS 216 may receive an indication that storage 265 of the dock 250 and the input device(s) 270 are unavailable due to removal. Accordingly, the computing device 205 may resume use of its own storage 220 and user interface 226.

To resume normal operation after the hot remove 204, the execution management module 214 may cause another interrupt to be generated (e.g., an SCI). This other interrupt may be an interrupt visible to the OS 216 and may cause the OS 216 to reevaluate capabilities of the hardware, such as processor performance and/or memory bandwidth. In various embodiments, the OS 216 may issue a CPUID opcode to determine processor type and memory capabilities. In response to the CPUID request, the execution management module 214 may respond to the OS 216 with information corresponding to the processor 210 and/or memory 215.

Figure 3:
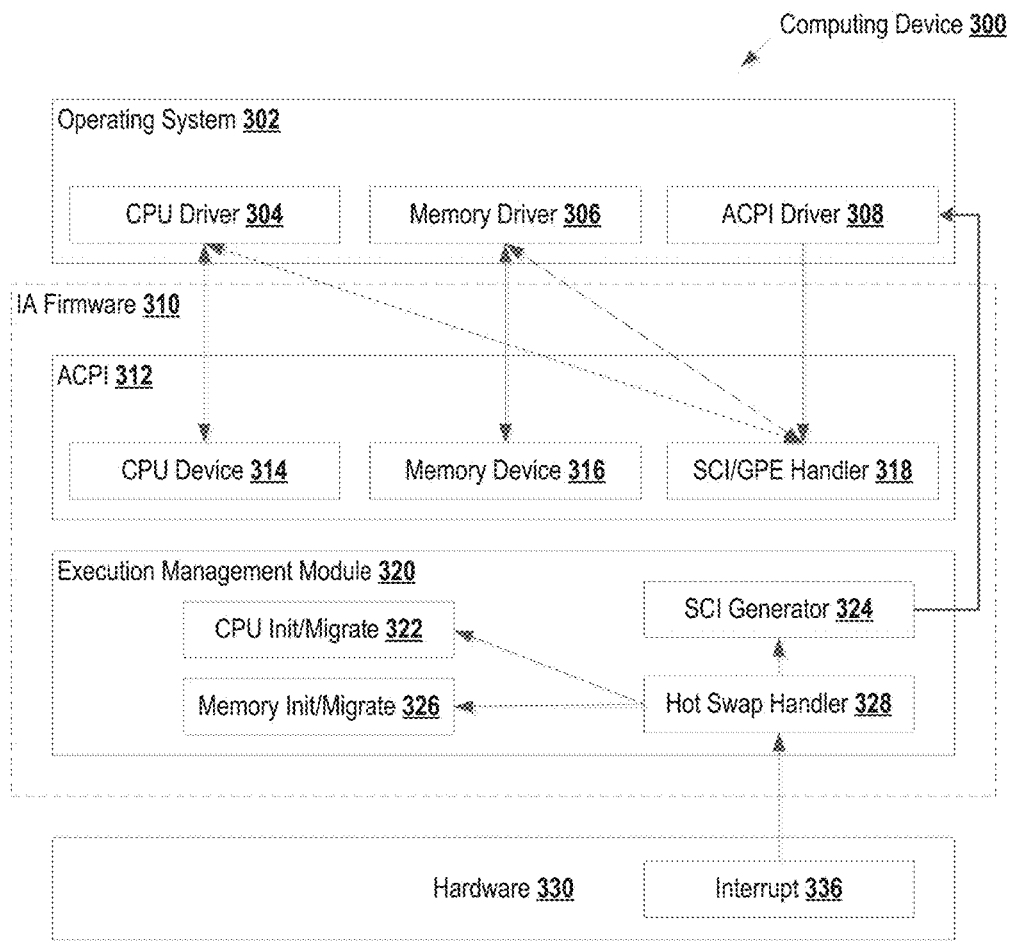
FIG. 3 is a block diagram illustrating an example computing device incorporated with an execution management module for execution context migration between processors, in accordance with various embodiments.

Now with reference to FIG. 3, a block diagram illustrates an example computing device 300 incorporated with an execution management module 320 for execution context migration between processors, in accordance with various embodiments of the present disclosure. In relation to embodiments described in FIG. 1, the computing device 300 may be an embodiment of the portable electronic device 105.

The OS 302 of the computing device 300 may include or be communicatively coupled with a CPU driver 304, a memory driver 306, and an ACPI driver 308. The CPU driver 304 may operate, control, and/or provide an interface to the CPU device 314. The memory driver 306 may operate, control, and/or provide an interface to the memory device 316. The ACPI driver 308 may operate, control, and/or provide an interface to the SCI/general purpose event (GPE) handler 318.

The instruction architecture (IA) firmware 310 of the computing device 300 may comprise persistent memory and code associated with control of the computing device 300. In one embodiments, the IA firmware 310 may be an Intel® Architecture firmware. In embodiments, the IA firmware 310 may include an ACPI layer 312. The ACPI layer 312 may he associated with power control and configuration of devices in the computing device 300, such as a CPU device 314, memory device 316, and/or SCI/GPE handler 318.

The IA firmware 310 may further include an execution management module 320. In various embodiments, the execution management module may comprise code and data associated with SMM. This code and data may include a hot swap handler 328, a CPU initialization and migration module 322, a memory initialization and migration module 326, and an SCI generator 324. In embodiments, the hardware 330 of the computing device 300 may be configured to generate an interrupt 336 (e.g., an SMI) in response to the hot swap of components (e.g., a dock).

In embodiments, a change affecting hardware 330 of the computing device 300, such as a hot swap of an external component (not shown) having another processor and memory, may cause an interrupt 336 (e.g., an SMI) to be generated. The interrupt may be detected and handled by the hot swap handler 328. In response, the hot swap handler 328 may cause execution of the CPU initialization and migration module 322. For a hot plug, the CPU initialization and migration module 322 may initialize a processor of the external component. For a hot remove, the CPU initialization and migration module 322 may initialize a core associated with the CPU device 314.

Similarly, the hot swap handler 328 may cause execution of the memory initialization and migration module 326 in response to the interrupt. For a hot plug, the memory initialization and migration module 326 may initialize a memory of the external component. For a hot remove, the CPU initialization and migration module 322 may initialize memory associated with the memory device 316.

After processor initialization, the CPU initialization and migration module 322 may migrate at least a part of a state associated with a processor between memory associated with the memory device 316 and memory of the external component. For a hot plug, the CPU initialization and migration module 322 may copy at least part of a state associated with the CPU device 314 from memory associated with the memory device 316 to memory of the external component. For a hot remove, the CPU initialization and migration module 322 may copy at least part of a state associated with a processor of the external component from memory of the external component to memory associated with the memory device 316.

After memory initialization, the CPU initialization and migration module 322 may migrate data (e.g., instructions to be executed, cache data, and other data) between memory associated with the memory device 316 and the external component. For a hot plug, the CPU initialization and migration module 322 may copy data from memory associated with the memory device 316 to memory of the external component. For a hot remove, the CPU initialization and migration module 322 may copy data from memory of the external component to memory associated with the memory device 316.

In connection with this execution context migration, the hot swap handler 328 may cause the SCI generator 324 to generate an OS-visible interrupt (e.g., an SCI). This OS-visible interrupt may be detected by the ACPI driver 308. In response to the detected interrupt, the ACPI driver 308 may call the SCI/GPE handler 318. The SCI/GPE handler 318 may issue a notify operation (e.g., Notify (CPUx, 0x80)) to inform an OS Power Management (OSPM) that the OS 302 is to reevaluate the processor and/or memory available to the computing device 300.

In response, the OSPM may issue a request to determine processor performance and/or memory bandwidth available to the computing device. For example, the OSPM may request a CPUID operation. In embodiments, the OSPM may follow an ACPI specification to a Performance Present Capabilities (_PPC) method to request an updated performance indication, such as an indication of a P state available to the OS 302. An example of this request may comprise ACPI code:

For a hot plug, the execution management module 320 may respond with an indication of processor performance and/or memory bandwidth available from the processor of the external component. However, this indication may include an identification associated with the CPU device 314. Thus, the migration to the processor of the external component may be transparent to the OS 302 (e.g., the OS 302 may be unaware of the migration to new hardware). Accordingly, the OS 302 may not be aware of a RAS flow, for example, defined by an ACPI or DIG64 specification, rather, the OS 302 may only be aware of the processor performance and/or memory bandwidth (e.g., P state).

For a hot remove, the execution management module 320 may respond with an indication of performance and/or memory associated with the CPU device 314 and/or memory device 316, which may correspond with conventional operation of the computing device 300.

Figure 4:
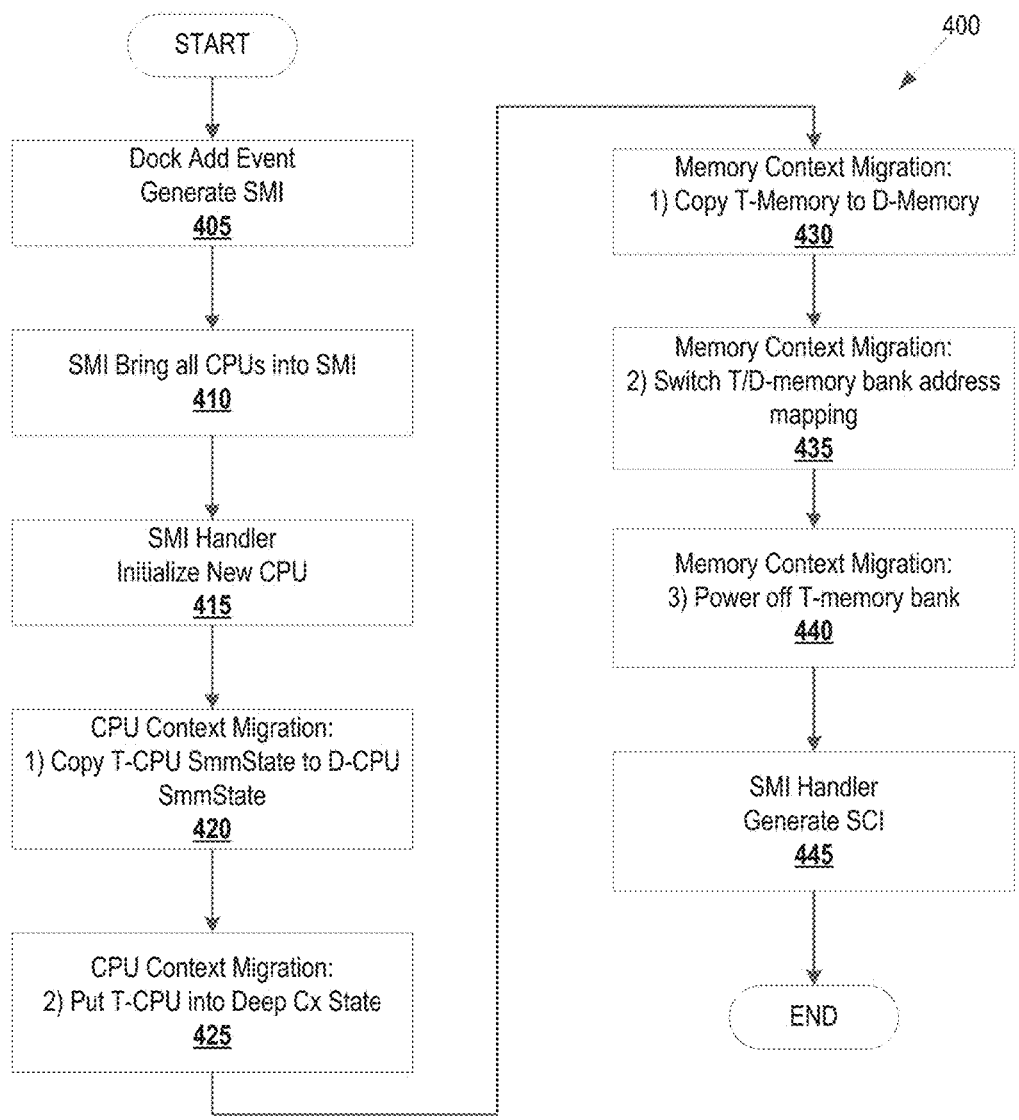
FIG. 4 is a flow diagram illustrating a method for migrating execution context from a portable electronic device to a dock, in accordance with various embodiments.

Referring now to FIG. 4, a flow diagram illustrates a method 400 for migrating execution context from a portable electronic device (T) to a dock (D), in accordance with various embodiments of the present disclosure. The method 400 may be practiced in one or more computing systems described in the present disclosure, such as the computing systems 100, 200 and 300 of FIGS. 1-3 While the method 400 illustrates a plurality of sequential operations, one of ordinary skill would recognize that one or more operations of the method 400 may be omitted and/or transposed.

Beginning with operation 405, the method 400 may include generating an SMI within a portable electronic device. The SMI may be generated in response to coupling of a dock with the portable electronic device. At operation 410, the method 400 may include bringing all CPUs of the portable electronic device into an SMI state, which may effect SMM in the portable electronic device. Operation 415 may include initializing a CPU of the dock. This operation 415 may be performed by e.g., an SMI handler, which may be an element of an execution management module of the portable electronic device.

```
    Name (_PSS, Package( )        //Performance Supported States
    {
        Package ( ) {650, 21500, 500, 300, 0x00, 0x08}    //Performance State
zero (P0)      // B-CPU
        Package ( ) {600, 14900, 500, 300, 0x01, 0x05}    //Performance State
one (P1)       // T-CPU
        Package ( ) {500, 8200, 500, 300, 0x02, 0x06}     //Performance State
two (P2)       // T-CPU
    })       // End of _PSS object
    Method (_PPC, 0)      //Performance Present Capabilities method
    {
        If (\_SB.DOCK)
        {
            Return(0)            // All_PSS states available (650, 600, 500). Both B-
CPU and T-CPU.
        }
        If (\_SB.AC)
        {
            Return(1)            // States 1 and 2 available (600, 500). T-CPU only.
        }
        Else
        {
            Return(2)            //State 2 available (500). T-CPU only.
        }
    }           //End of _PPC method
```

The execution management module 320 may receive this request from the OSPM and respond with an indication of the processor performance and/or memory bandwidth of the available processor, for example, so that ACPI tables and/or other performance policy may be updated to reflect processor and/or memory capabilities (e.g., P state).

Thereafter, CPU context migration may be started. First, operation 420 may include copying at least a part of a processor state associated with the portable electronic device (T-CPU SmmState) to memory of the dock associated with processor state (D-CPU SmmState). In embodiments, this operation 420 may comprise copying T-CPU SMMstate stored in system management RAM of the portable electronic device (e.g., LPDDR associated with the processor) to system management RAM of the dock (e.g., DDR4 associated with the processor). Second, operation 425 may include transitioning the processor of the portable electronic device (T-CPU) to a deeper C state (i.e., processor operating state), such as C1-C9. However, at least one core of the processor of the portable electronic device may remain active to control execution context migration and/or to execute secure operations.

Similarly, memory context migration may be performed. At operation 430, the method 400 may include copying memory of the portable electronic device (T-memory) to memory of dock (D-memory). This operation 430 may include copying RAM memory from the portable electronic device to the dock.

Operation 435 may include switching memory banks and associated address mapping from memory of the portable electronic device to memory of the dock. For example, memory of the portable electronic device may be 0G~1G and memory of the dock may be 1G~2G and, at operation 435, a memory bank of the portable electronic device may be switched to map memory of the portable electronic device to 1G~2G and map memory of the dock to 0G~1G so that when normal operation resumes, an OS of the portable electronic device may use memory of the dock instead of memory of the portable electronic device.

At operation 440, the method 400 may include transitioning one or more memory banks of the portable electronic device to a low-power state. However, at least a part of the memory of the portable electronic device may remain active, for example, to trap secure operations and send those secure operations to the CPU of the portable electronic device and/or to dynamically store a copy of processor state and/or instructions associated with the dock for restoration of context in the event of a hot remove. To resume normal operation, operation 445 may include generating an SCI. The SCI may be generated by an SMI handler (or other component of an execution management module) and may cause the OS of the portable electronic device to reevaluate processor performance and/or memory bandwidth. In various embodiments, the SCI may cause resumption of execution using the CPU of the dock.

Figure 5:
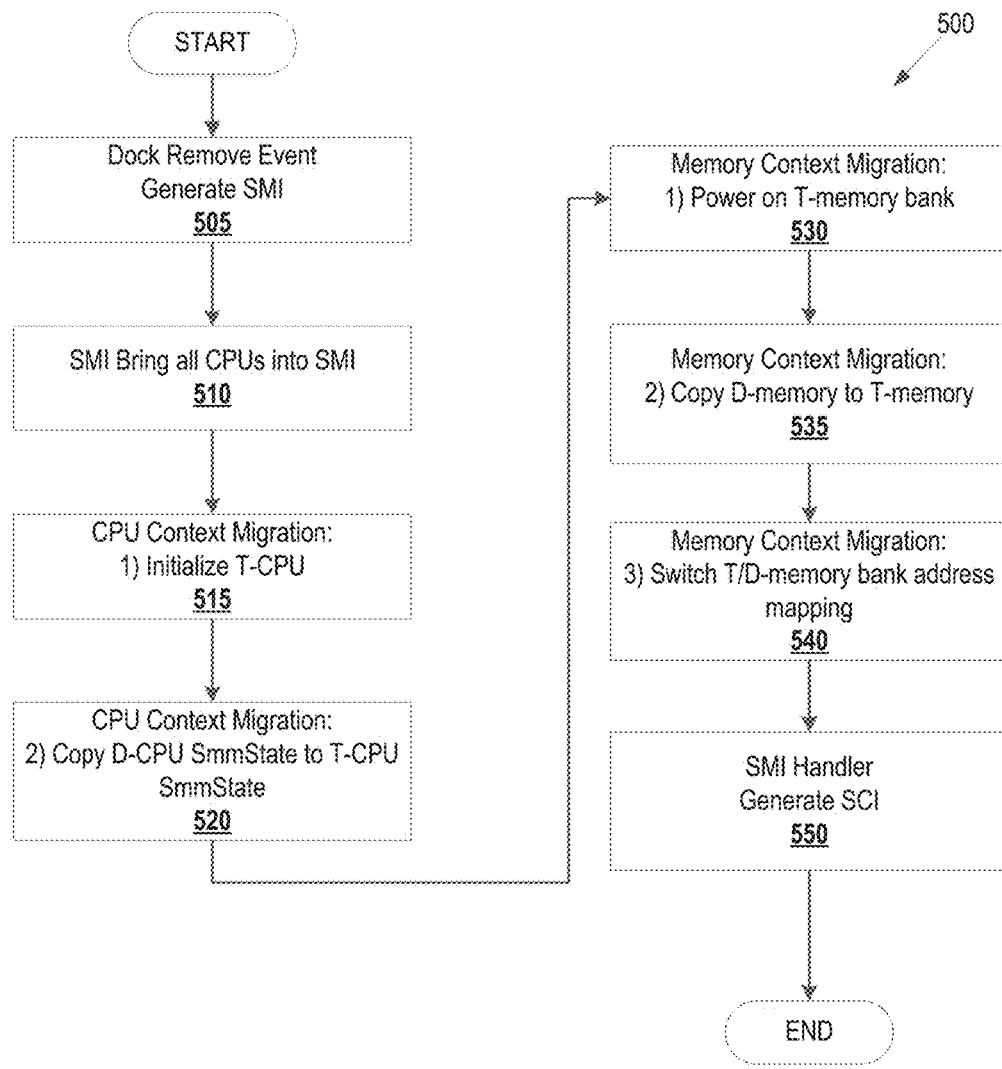
FIG. 5 is a flow diagram illustrating a method for migrating execution context to a portable electronic device from a dock, in accordance with various embodiments.

Turning now to FIG. 5, a flow diagram illustrates a method 500 for migrating execution context to a portable electronic device (T) from a dock (D), in accordance with various embodiments of the present disclosure. The method 500 may be practiced in one or more computing systems described in the present disclosure, such as the computing system 100 of FIG. 1. While the method 500 illustrates a plurality of sequential operations, one of ordinary skill would recognize that one or more operations of the method 500 may be omitted and/or transposed.

Beginning with operation 505, the method 500 may include generating an SMI in a portable electronic device. The SMI may be generated in response to uncoupling a dock from a portable electronic device. At operation 510, the method 500 may include bringing all CPUs of the portable electronic device into an SMI state, which may effect SMM. In the portable electronic device. Operation 515 may include re-initializing a CPU of the portable electronic device (T-CPU). Because at least one core of the CPU of the portable electronic device may be active, this operation 515 may comprise activating a previously inactive core of the CPU. This operation 515 may be performed by an SMI handler, which may be an element of an execution management module.

Thereafter, CPU context migration may be started. First, operation 520 may include copying at least a part of a processor state associated with the dock (D-CPU SmmState) to memory of the portable electronic device associated with processor state (T-CPU SmmState). In embodiments, at least a part of memory of the portable electronic device may remain active and have stored therein execution context (e.g., processor state and/or instructions to be executed). For example, this operation 520 may comprise copying D-CPU SMMstate dynamically stored RAM of the portable electronic device to system management RAM of the portable electronic device (e.g., LPDDR associated with the processor) for resumption of operation of the portable electronic device using the CPU of the portable electronic device.

Similarly, memory context migration may be performed. At operation 530, the method 500 may include initializing or powering on one or more memory banks of the portable electronic device (T-memory). Thereafter, operation 535 may include copying memory of the dock (D-memory) to memory of the portable electronic device (T-memory). This operation 535 may include copying RAM memory associated with the dock to the portable electronic device. In embodiments, at least a part of memory of the portable electronic device may remain active and have stored therein a copy of RAM memory from the dock (e.g., instructions to be executed and/or other context data). For example, this operation 535 may comprise loading memory associated with DDR4 of the dock and dynamically stored RAM of the portable electronic device for resumption of operation of the portable electronic device using the CPU of the portable electronic device.

Operation 540 may include switching memory banks and associated address mapping from memory of the dock to memory of the portable electronic device. For example, memory of the portable electronic device may be 1G~2G and memory of the dock may be 0G~1G and, at operation 540, a memory bank of the portable electronic device may be switched to map memory of the portable electronic device to 0G~1G and map memory of the dock to 1G~2G (or remove mapping of the dock's memory) so that when normal operation resumes an OS of the portable electronic device may use memory of the portable electronic device.

To resume normal operation, operation 550 may include generating an SCI. The SCI may be generated by an SMI handler (or other component of an execution management module) and may cause the OS of the portable electronic device to reevaluate processor performance and/or memory bandwidth.

Figure 6:
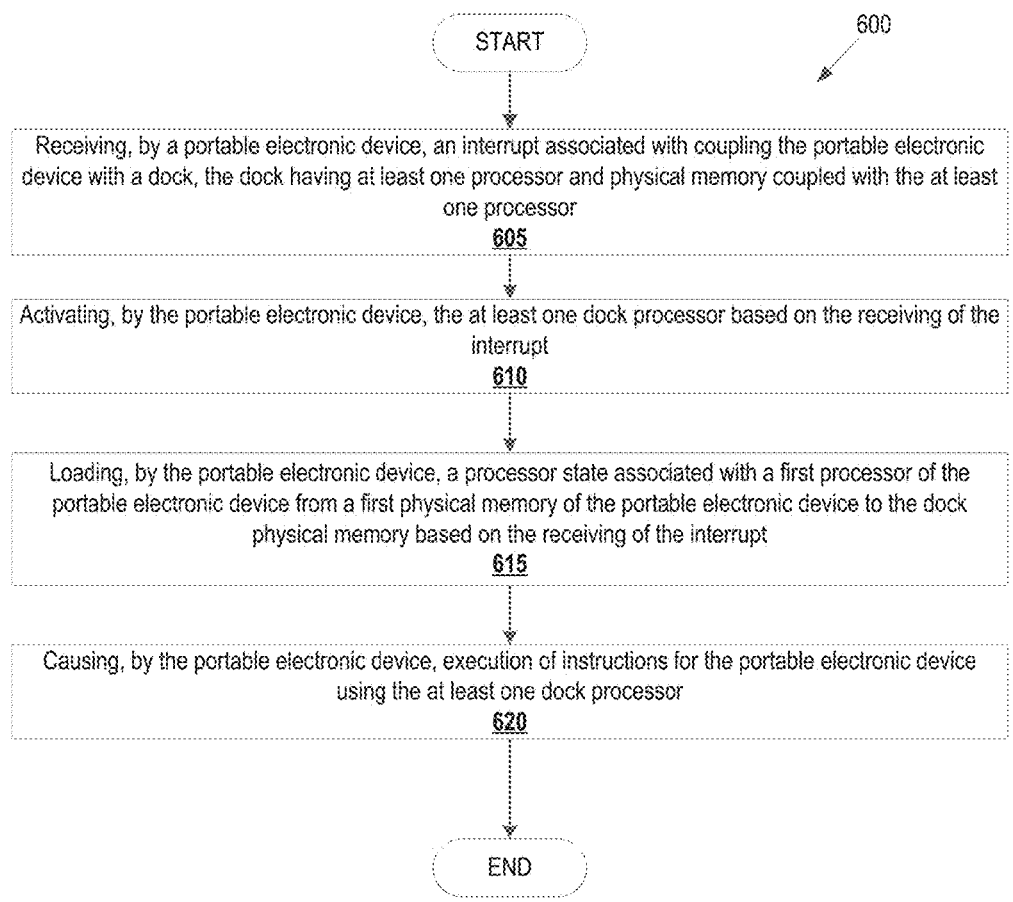
FIG. 6 is a flow diagram illustrating another method for migrating execution context from a portable electronic device to a dock, in accordance with various embodiments.

Referring now to FIG. 6, a flow diagram illustrates another method 600 for migrating execution context between a portable electronic device and a dock, in accordance with various embodiments of the present disclosure. The method 600 may be practiced in one or more computing systems described in the present disclosure, such as the computing systems 100, 200 and 300 of FIGS. 1-3. While the method 600 illustrates a plurality of sequential operations, one of ordinary skill would recognize that one or more operations of the method 600 may be omitted and/or transposed.

The method 600 may begin with an operation 605 for receiving, by a portable electronic device, an interrupt associated with coupling the portable electronic device with a dock. In embodiments, the dock may have at least one processor and physical memory coupled with the at least one processor. Thereafter, operation 610 may comprise activing, by the portable electronic device, the at least one dock processor based on the receiving of the interrupt.

At operation 615, the method 600 may include loading, by the portable electronic device, a processor state associated with a first processor of the portable electronic device from first physical memory of the portable electronic device to the dock physical memory based on the receiving of the interrupt.

Finally, the method 600 may include operation 620 for causing, by the portable electronic device, execution of instructions for the portable electronic device using at least one processor of the dock.

Figure 7:
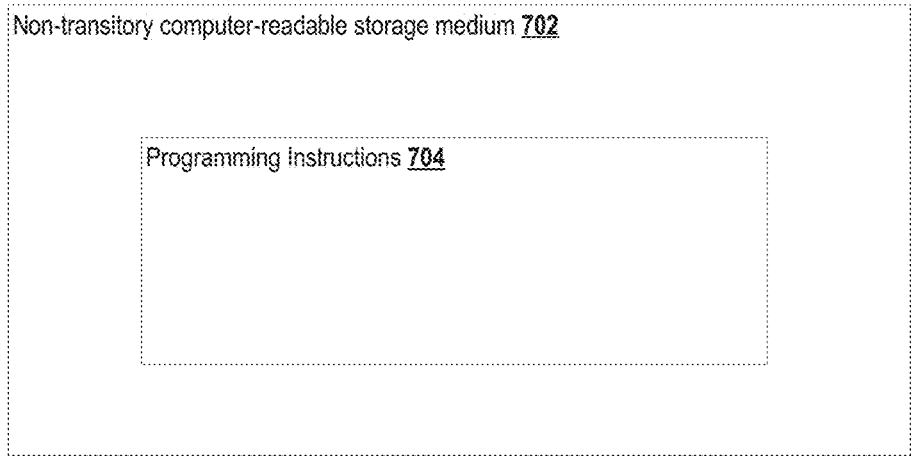
FIG. 7 illustrates an example non-transitory computer-readable storage medium having instructions configured to practice all or selected aspects of the embodiments of the present disclosure.

FIG. 7 illustrates an example non-transitory computer-readable storage medium having instructions configured to practice all or selected aspects of the method of FIGS. 4, 5, and/or 6, in accordance with various embodiments of the present disclosure. As illustrated, non-transitory computer-readable storage medium 702 may include a number of programming instructions 704. Programming instructions 704 may be configured to enable a computing system, e.g., computing device 100, in response to execution of the programming instructions, to perform all or selected aspects of operations of method 400 earlier described with reference to FIG. 4, operations of method 500 earlier described with reference to FIG. 5, and/or operations of method 600 earlier described with reference to FIG. 6. Referring back to FIG. 1, programming instructions 704 may be configured to enable a computing system to perform all of selected features described with respect to the computing system 100. Referring back to FIG. 2, programming instructions 704 may be configured to enable a computing system to perform all of selected features described with respect to the execution management module 214. Referring back to FIG. 3, programming instructions 704 may be configured to enable a computing system to perform all of selected features described with respect to the execution management module 320. In alternate embodiments, programming instructions 704 may be disposed on multiple non-transitory computer-readable storage media 702.

In various embodiments, example 1 may be a computing device with migration of execution context, the computing device comprising: one or more first processors; first physical memory, coupled with the one or more processors, to store an operating system to be loaded into the physical memory for execution by the one or more processors; and an execution management module, to be loaded into the physical memory and operated by the one or more processors, to: detect an interrupt associated with coupling a hardware component with the computing device, the hardware component having one or more additional processors and additional physical memory coupled with the one or more additional processors; initialize the one or more additional processors based on the detected interrupt; and copy at least part of a state associated with the one or more first processors from the first physical memory to the additional physical memory based on the detected interrupt. Example 2 may include the computing device of example 1, wherein the computing device is a portable electronic device. Example 3 may include the computing device of example 1, wherein the one or more first processors consume less power during operation relative to the one or more additional processors. Example 4 may include the computing device of example 1, wherein the hardware component comprises a base adapted to have the computing device docked thereto. Example 5 may include the computing device of example 1, wherein the first physical memory comprises first Double-Data-Rate (DDR) Synthronous Dynamic Random Access Memory (SDRAM) and the additional physical memory comprises additional DDR SDRAM. Example 6 may include the computing device of any of examples 1-5, wherein the execution management module is further to: copy one or more instructions from the first physical memory to the additional physical memory based on the detected interrupt. Example 7 may include the computing device of any of examples 1-5, wherein the execution management module is further to: switch one or more first memory banks associated with the first physical memory to one or more additional memory banks associated with the additional physical memory; and switch address mapping from the one or more first memory banks to the one or more additional memory banks. Example 8 may include the computing device of any of examples 1-5, wherein the execution management module is further to: cause at least one of the one or more first processors and the first physical memory to transition to a low-power state. Example 9 may include the computing device of example 8, wherein the execution management module is further to: detect a CPUID request from the operating system; and respond to the CPUID request with a first indication of the one or more first processors and second indication of resources available through the one or more additional processors. Example 10 may include the computing device of any of examples 1-5, wherein the execution management module is further to: detect an interrupt associated with uncoupling the hardware component from the computing device; initialize the one or more first processors based on the detected other interrupt; and copy at least part of a state associated with the one or more additional processors from the additional physical memory to the first physical memory based on the detected other interrupt. Example 11 may include the computing device of any of examples 1-5, wherein execution management module is further to: cause one or more instructions associated with trusted execution context to be loaded only into the first physical memory and executed only by the first one or more processors. Example 12 may include the computing device of any of examples 1-5, wherein the one or more first processors include at least one core associated with execution of system management mode, and the at least one core associated with execution of system management mode is to operate the execution management module.

In various embodiments, example 13 may be a computer-implemented method for migrating execution context associated with a portable electronic device, the method comprising: receiving, by the portable electronic device, an interrupt associated with coupling the portable electronic device with a dock, the dock having at least one processor and physical memory coupled with the at least one processor; activating, by the portable electronic device, the at least one dock processor based on the receiving of the interrupt; loading, by the portable electronic device, a processor state associated with a first processor of the portable electronic device from a first physical memory of the portable electronic device to the dock physical memory based on the receiving of the interrupt; and causing, by the portable electronic device, execution of instructions for the portable electronic device using the at least one dock processor. Example 14 may include the computer-implemented method of example 13, wherein the portable electronic device is a tablet or a smartphone. Example 15 may include the computer-implemented method of example 13, further comprising: detecting, by the portable electronic device, one or more secure mode instructions; and executing, by the portable electronic device, the one or more secure mode instructions using the first processor of the portable electronic device. Example 16 may include the computer-implemented method of example 15, further comprising: causing, by the portable electronic device, a system management interrupt based on the detecting of the one or more secure mode instructions; and switching, by the portable electronic device, from the at least one dock processor to the first processor based on the system management interrupt. Example 17 may include the computer-implemented method of example 13, further comprising: issuing, by the portable electronic device, a challenge to the dock; receiving, by the portable electronic device, a response to the challenge; and determining, by the portable electronic device, that the dock is verified for the executing of the one or more instructions based on the response. Example 18 may include the computer-implemented method of any of examples 13-17, further comprising: swapping, by the portable electronic device, a first memory bank associated with the first physical memory into a second memory bank associated with the dock physical memory; and updating, by the portable electronic device, one or more address mapping from the first memory bank to the second memory bank based on the swapping. Example 19 may include the computer-implemented memory of any of examples 13-17, further comprising: receiving, by the portable electronic device, a CPUID instruction from an operating system of the portable electronic device; and responding, by the portable electronic device, to the CPUID instruction based on the activating of the at least one dock processor. Example 20 may include the computer-implemented method of any of examples 13-17, further comprising: updating, by the portable electronic device, one or more advanced configuration and power interface (ACPI) tables associated with an operating system of the portable electronic device based on the activating of the at least one dock processor.

In various embodiments, example 21 may be one or more non-transitory computer system-readable media comprising computing device-executable instructions, wherein the instructions, in response to execution by a computing device, cause the computing device to: process an interrupt associated with detachment of an external component, the external component including another processor and another memory coupled with the other processor; initialize an internal processor of the computing device based on the interrupt; copy at least part of a state associated with the other processor from the other memory to internal memory of the computing device based on the interrupt; and cause execution of instructions using the internal processer of the computing device based at least in part on the state in the internal memory. Example 22 may include the one or more non-transitory computer system-readable media of example 21, wherein the computing device is a smartphone or a tablet computer adapted to dock with the external component. Example 23 may include the one or more non-transitory computer system-readable media of example 21, wherein the interrupt comprises a system management interrupt. Example 24 may include the one or more non-transitory computer system-readable media of any of examples 21-23, wherein the instructions are further to cause the computing device to: detect another interrupt associated with attachment of the external component; copy at least a part of a second state associated with the internal processor from the internal memory to the other memory based on the other interrupt; and cause execution of instructions using the other processer. Example 25 may include the one or more non-transitory computer system-readable media of example 24, wherein, after detection of the other interrupt, the instructions are further to cause the computing device to: receive a CPUID instruction from an operating system of the computing device; and respond, to the operating system, with an identification of the internal processor and an indication of capability of the other processor.

In various embodiments, example 26 may be a portable electronic device comprising: means for receiving, by the portable electronic device, an interrupt associated with coupling the portable electronic device with a dock, the dock having at least one processor and physical memory coupled with the at least one processor; means for activating, by the portable electronic device, the at least one dock processor based on the receiving of the interrupt; means for loading, by the portable electronic device, a processor state associated with a first processor of the portable electronic device from a first physical memory of the portable electronic device to the dock physical memory based on the receiving of the interrupt; and means for causing, by the portable electronic device, execution of instructions for the portable electronic device using the at least one dock processor. Example 27 may include the portable electronic device of example 26, wherein the portable electronic device is a tablet or a smartphone. Example 28 may include the portable electronic device of example 26, further comprising: means for detecting, by the portable electronic device, one or more secure mode instructions; and means for executing, by the portable electronic device, the one or more secure mode instructions using the first processor of the portable electronic device. Example 29 may include the portable electronic device of example 28, further comprising: means for causing, by the portable electronic device, a system management interrupt based on the detecting of the one or more secure mode instructions; and means for switching, by the portable electronic device, from the at least one dock processor to the first processor based on the system management interrupt. Example 30 may include the portable electronic device of example 26, further comprising: means for issuing, by the portable electronic device, a challenge to the dock; means for receiving, by the portable electronic device, a response to the challenge; and means for determining, by the portable electronic device, that the dock is verified for the executing of the one or more instructions based on the response. Example 31 may include the portable electronic device of any of examples 26-30, further comprising: means for swapping, by the portable electronic device, a first memory bank associated with the first physical memory into a second memory bank associated with the dock physical memory; and means for updating, by the portable electronic device, one or more address mapping from the first memory bank to the second memory bank based on the swapping. Example 32 may include the portable electronic device of any of examples 26-30, further comprising: means for receiving, by the portable electronic device, a CPUID instruction from an operating system of the portable electronic device; and means for responding, by the portable electronic device, to the CPUID instruction based on the activating of the at least one dock processor. Example 33 may include the portable electronic device of any of examples 26-30, further comprising: means for updating, by the portable electronic device, one or more advanced configuration and power interface (ACPI) tables associated with an operating system of the portable electronic device based on the activating of the at least one dock processor. Example 34 may include the portable electronic device of any of examples 26-30, further comprising: means for presenting, by the portable electronic device, at least a part of the dock physical memory to an operating system of the portable electronic device as removable storage media.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the arts. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the invention also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine- (e.g., a computer-) readable storage medium (e.g., read only memory ("ROM"), random access memory ("RAM"), magnetic disk storage media, optical storage media, flash memory devices)

The processes or methods depicted in the preceding figures can be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein. In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. A computing device with migration of execution context, the computing device comprising:
one or more first processors;
first physical memory, coupled with the one or more processors, to store an operating system to be loaded into the physical memory for execution by the one or more processors; and
an execution management module, to be loaded into the physical memory and operated by the one or more processors, to:
detect an interrupt associated with coupling a hardware component with the computing device, the hardware component having one or more additional processors and additional physical memory coupled with the one or more additional processors;
initialize the one or more additional processors based on the detected interrupt; and
copy at least part of a state associated with the one or more first processors from the first physical memory to the additional physical memory based on the detected interrupt.

2. The computing device of claim 1, wherein the computing device is a portable electronic device.

3. The computing device of claim 1, wherein the one or more first processors consume less power during operation relative to the one or more additional processors.

4. The computing device of claim 1, wherein the hardware component comprises a base adapted to have the computing device docked thereto.

5. The computing device of claim 1, wherein the first physical memory comprises first Double-Data-Rate (DDR) Synchronous Dynamic Random Access Memory (SDRAM) and the additional physical memory comprises additional DDR SDRAM.

6. The computing device claim 1, wherein the execution management module is further to:
copy one or more instructions from the first physical memory to the additional physical memory based on the detected interrupt.

7. The computing device of claim 1, wherein the execution management module is further to:
switch one or more first memory banks associated with the first physical memory to one or more additional memory banks associated with the additional physical memory; and
switch address mapping from the one or more first memory banks to the one or more additional memory banks.

8. The computing device of claim 1, wherein the execution management module is further to:
cause at least one of the one or more first processors and the first physical memory to transition to a low-power state.

9. The computing device of claim 8, wherein the execution management module is further to:
detect a CPUID request from the operating system; and
respond to the CPUID request with a first indication of the one or more first processors and a second indication of resources available through the one or more additional processors.

10. The computing device of claim 1, wherein the execution management module is further to:
detect another interrupt associated with uncoupling the hardware component from the computing device;
initialize the one or more first processors based on the detected other interrupt; and
copy at least part of a state associated with the one or more additional processors from the additional physical memory to the first physical memory based on the detected other interrupt.

11. The computing device of claim 1, wherein the execution management module is further to:
cause one or more instructions associated with trusted execution context to be loaded only into the first physical memory and executed only by the one or more first processors.

12. The computing device of claim 1, wherein the one or more first processors include at least one core associated with execution of a system management mode, and the at least one core associated with execution of the system management mode is to operate the execution management module.

13. A computer-implemented method for migrating execution context associated with a portable electronic device, the method comprising:
   receiving, by the portable electronic device, an interrupt associated with coupling the portable electronic device with a dock, the dock having at least one processor and physical memory coupled with the at least one processor;
   activating, by the portable electronic device, the at least one dock processor based on the receiving of the interrupt;
   loading, by the portable electronic device, a processor state associated with a first processor of the portable electronic device from a first physical memory of the portable electronic device to the dock physical memory based on the receiving of the interrupt; and
   causing, by the portable electronic device, execution of instructions for the portable electronic device using the at least one dock processor.

14. The computer-implemented method of claim 13, wherein the portable electronic device is a tablet or a smartphone.

15. The computer-implemented method of claim 13, further comprising:
   detecting, by the portable electronic device, one or more secure mode instructions; and
   executing, by the portable electronic device, the one or more secure mode instructions using the first processor of the portable electronic device.

16. The computer-implemented method of claim 15, further comprising:
   causing, by the portable electronic device, a system management interrupt based on the detecting of the one or more secure mode instructions; and
   switching, by the portable electronic device, from the at least one dock processor to the first processor based on the system management interrupt.

17. The computer-implemented method of claim 13, further comprising:
   issuing, by the portable electronic device, a challenge to the dock;
   receiving, by the portable electronic device, a response to the challenge; and
   determining, by the portable electronic device, that the dock is verified for the executing of the one or more instructions based on the response.

18. The computer-implemented method of claim 13, further comprising:
   swapping, by the portable electronic device, a first memory bank associated with the first physical memory into a second memory bank associated with the dock physical memory; and
   updating, by the portable electronic device, one or more address mapping from the first memory bank to the second memory bank based on the swapping.

19. The computer-implemented method of claim 13, further comprising:
   receiving, by the portable electronic device, a CPUID instruction from an operating system of the portable electronic device; and
   responding, by the portable electronic device, to the CPUID instruction based on the activating of the at least one dock processor.

20. The computer-implemented method of claim 13, further comprising:
   updating, by the portable electronic device, one or more advanced configuration and power interface (ACPI) tables associated with an operating system of the portable electronic device based on the activating of the at least one dock processor.

* * * * *